Jan. 1, 1929.
O. J. WILLIAMS
CAGE SUPPORT FOR CRUSHERS
Filed Jan. 25, 1928
1,697,297
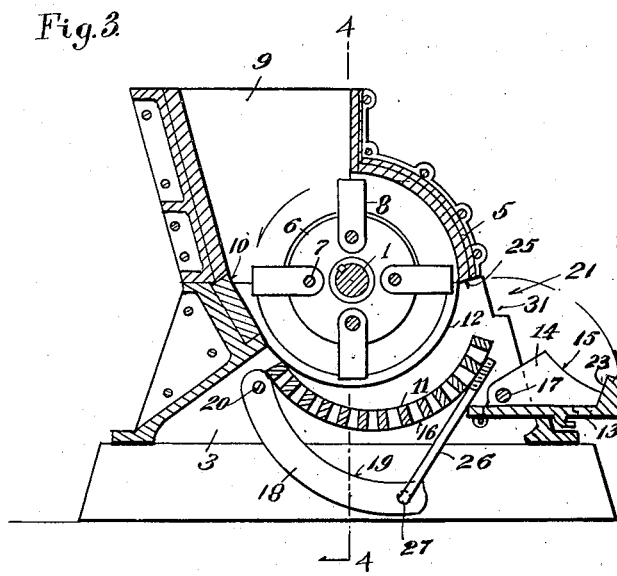
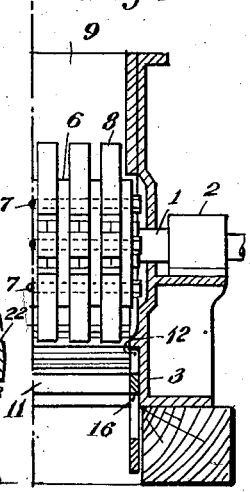
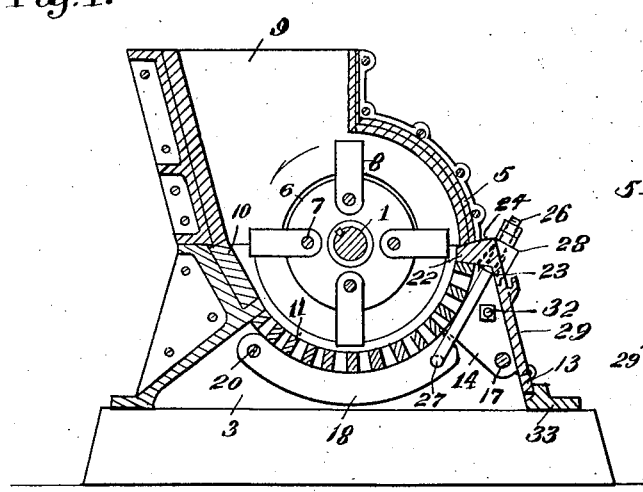
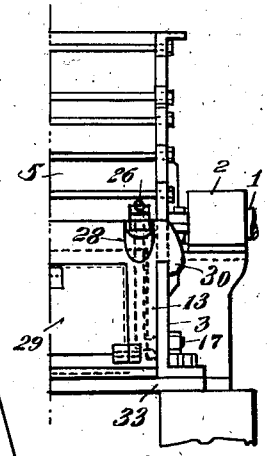
Inventor
Oliver J. Williams,
By H. M. Plaisted,
Attorney.

Patented Jan. 1, 1929.

1,697,297

UNITED STATES PATENT OFFICE.

OLIVER J. WILLIAMS, OF BURLINGAME, CALIFORNIA.

CAGE SUPPORT FOR CRUSHERS.

Application filed January 25, 1928. Serial No. 249,263.

This invention relates to certain new and useful improvements in cage supports for crushers the peculiarities of which will be hereinafter fully described and claimed.

The main object of my invention is to provide a hinged cage support that will swing outward and backward, leaving an opening in the back of the crusher that will allow the cage to be drawn out without having to remove the cover; secondly, to provide a projection on the swing back that will engage and hold the arcuate cage in place in operation against the circular stress of the rotary hammers when crushing material between the cage and the hammers; thirdly, to transfer this cage stress from the cover to the back spacer plate; and fourthly, to provide cage-supporting means of separately pivoted members adapted to be securely fastened together to hold the cage in operative position.

In the accompanying drawing on which like reference numerals indicate corresponding parts, Fig. 1 represents a vertical sectional view across the shaft of a suitable crusher and cage, with my cage support holding the cage in operative position;

Fig. 2, a back or rear elevation of half the crusher;

Fig. 3, a sectional view similar to Fig. 1, showing the cage support released and the cage freed and ready to be removed; and Fig. 4, a vertical sectional view of half the crusher taken on the line 4—4 of Fig. 3.

The numeral 1 indicates a horizontal shaft mounted in suitable bearings 2 carried by pedestals on the base plate 3, forming with the upper side plates and cover 5, a housing for a rotary cylinder comprising a set of spaced discs 6 on the shaft, through holes in which discs and eccentric to the shaft, are passed hammer rods 7 on which are pivotally mounted rotary beaters or hammers 8, that crush the material fed to a hopper 9, in co-operation with a breaker plate 10 and arcuate cage 11 mounted between said base plates of the housing. Said cage of spaced bars or otherwise, is held against an inwardly projecting ledge or shoulder 12 by my cage support, that comprises a swing back spacing plate 13 having at each side next to the side housing base plate, a flange 14 extending inward and having a bearing surface 15 curved to match the contour of the side ribs or edges 16 of said cage, and adapted to support the rear portion of the cage when swung inward as shown in Fig. 1. This back plate is hinged on a pivot rod 17 passing through the lower part of the flange 14 near the bottom of the plate, or otherwise, so that the said back plate can swing outward and preferably downward, as shown in Fig. 3, away from its engagement with the cage. The front and lower part of the cage is held against the said shoulder 12 by a separately hinged member of my cage support, consisting preferably of a bar 18 curved at 19 like the flange 14 and hinged at its front end on a rod 20 carried by the side housing or otherwise. This bar 18 is also in duplicate and its upper edge 19 forms with the bearing edge 15 a continuous support in the same plane for the respective side edge of the cage when in the position shown in Fig. 1, and swings down and releases the cage as shown in Fig. 3. The cage can then be removed through the open space 21 provided by swinging the back plate outward and downward as indicated in Fig. 3.

The swing back plate is provided on its upper end preferably with an inward lip projection 22, the under side 23 of which is adapted to fit over and lock the rear upper end of the cage to prevent circular movement of the cage on the cage support. The upper side 24 of said lip projection is a curved surface about said pivot rod 17, and makes a closing engagement with a matching surface 25 at the bottom of the cover, while allowing the swing back plate to open as in Fig. 3.

Fastening means to maintain the bearing surfaces 15 and 19 in supporting engagement with the underside of the cage as in Fig. 1, preferably consists of a rod 26, hooked or otherwise pivotally mounted by one end 27 at the rear end of said bar 18 and extending upward through a boss 28 on the back plate and threaded for nuts, whereby the bar 18 the flange 14 and the locking lip 22, are all brought into bearing position and held by tightening said nuts. The rod 26 is preferably in duplicate,—one for each pair of side supports. When inserting the cage, the front end is held by the front end of the bar 18, and the rear is held by the flange 14; then a door 29 in the back plate gives access to the rods 26 which are passed through tapered holes in their respective bosses 28 and the nuts applied to bring all said parts into firmly locked position. A lateral hook 30 on the swing back plate fits a notch 31 and hooks on the outside of the base plate, and a bolt 32 through the flange 14 and the base plate, further secures the back plate to the base plate so that the shock of the crushing operation reacts on the back plate and base plates instead of on the cover as in the usual construction.

At the bottom of the swing back plate is a cross bar 33, notched and bolted to the base plates to form a spacer and tie, as shown in Fig. 2.

While I have shown and described my cage-supporting means as front and back hinged members, the said members may be otherwise disposed relatively to the crusher and cage without departing from the spirit of my invention.

I claim:

1. A crusher comprising side housing base plates having inward projections, a detachable cage located below said projections, a hinged member pivoted away from the cage and forming a closing end plate when closed and an outlet for said cage when swung open and adapted to engage and support said cage against said projections in operative position when closed, and to swing open and allow release and removal of said cage.

2. A crusher comprising side housing base plates having inward arcuate shoulders, a detachable cage located below said shoulders, a hinged member forming a closing end plate for the casing and an outlet for the cage and provided with bearing flange adapted to support said cage when closed, and to release it when swung open.

3. A crusher comprising side housing base plates having inward arcuate shoulders, a cage located below said shoulders, a hinged back plate with bearing flanges near the base plates adapted to support said cage when closed, and release it when swung open, and means to fasten the back plate to the base plates.

4. A crusher comprising side housing plates having arcuate shoulders, a cage below said shoulders, a back plate hinged near the bottom and having bearing flanges extending inward adapted to support said cage when closed, and to swing outward and downward to release said cage and provide an opening in the back for its removal.

5. A crusher comprising side housing plates, a cage mounted between said plates, a hinged member having a projection extending radially inward and integral and swinging therewith and adapted to engage said cage and prevent circular movement in operation.

6. A crusher comprising side housing plates, a cage mounted between said plates, a hinged plate having a bearing flange for said cage and a hook projection adapted to engage said cage and prevent its circular movement on said bearing flange.

7. A crusher comprising side housing plates, a cage mounted between said plates, a back plate hinged near its bottom edge and having bearing flanges and a lip projection adapted to engage the cage below and above its rear end respectively and provided with lateral hook projections for engaging the side housing plates, substantially as described.

8. A crusher comprising side housing plates and cover, a cage mounted between said plates, a swing back plate hinged near its bottom edge and having bearing flanges for supporting said cage and a lip projection at the top adapted to engage the upper rear end of the cage and effect closing engagement with the bottom rear edge of the cover, substantially as described.

9. A crusher comprising side housing plates having inward shoulders, a cage mounted between said plates below said shoulders, a hinged back plate having a bearing surface for the rear part of the cage, a hinged bar having a bearing surface for the front part of the cage, and fastening means for holding the bearing surfaces of bar and back plate in engagement with the cage and the cage with said shoulders.

10. A crusher comprising side housing plates having inward shoulders, a cage mounted below said shoulders, a hinged back plate provided with a door and having a flange with a bearing surface for the rear of said cage, a hinged bar in the plane of said flange and pivoted near the front end of said cage and having a bearing surface for the front and middle of said cage, and a rod pivoted in the rear end of said bar and extending upward through the back plate, substantially as and for the purpose described.

11. A crusher comprising side housing plates, a cage mounted between said plates, a hinged back plate provided with a door and having bearing flanges adjacent the side and having bearing flanges adjacent the side housing for the rear of said cage, a hinged bar in the plane of each flange and having bearing surfaces for said cage, a hook rod pivotally mounted in each bar opposite its hinge and extending upward through holes in said back plate and accessible through said door, substantially as described.

12. A crusher comprising side housing plates having inward shoulders, a cage located below said shoulders, hinged supporting means for said cage consisting of separately pivoted members having bearing surfaces for said cage,—one member having interlocking engagement with said cage to prevent circular movement of the cage on said bearing surfaces,—and fastening means for securing said members in firm engagement with said cage and the cage with said shoulders.

13. A crusher comprising side housing plates, a cage detachably mounted between said plates, separately hinged members—one hinged at the front and the other at the bottom away from the cage,—and operatively located below and adapted to support said cage, and means to secure said members in cage-supporting position.

14. A crusher comprising a casing having one end hinged near the bottom bar spacer between the casing and adapted to swing open, a cage detachably mounted in said casing and adapted to be removed through said end when swung open.

15. A crusher comprising a casing having side housing plates and an end plate hinged thereto near the edge of said plates so as to swing outward away from the casing and cage and provide an inlet opening for inserting a cage, a cage detachably mounted in said casing and adapted to be removed through said end plate when open, and means to support said cage in operative position.

16. A crusher comprising side housing plates and an end plate adapted to open, a cage mounted within said plates and removable through said end plate when open, cage-supporting members for said cage, and fastening means connecting the end plate and cage-supporting members in operative position.

17. A crusher comprising a detachable cage, and a casing having a hinged end plate pivoted near its bottom away from the cage and having bearing surfaces near its top adjacent to said cage adapted to engage and support the cage when closed and to release the cage when swung open.

18. A crusher comprising a cage subject to circular sliding movement under circular stress, a casing having a pivotally movable end plate provided with a projection integral and swinging outward with said end plate and adapted to engage said cage, resist said stress and prevent said movement, and fastening means for said end plate.

In testimony whereof I have affixed my signature.

OLIVER J. WILLIAMS.